(«12») United States Patent
Savoy et al.

(10) Patent No.: US 9,815,109 B2
(45) Date of Patent: Nov. 14, 2017

(54) APPARATUS AND METHOD FOR MECHANICALLY JOINING ADVANCED HIGH STRENGTH STEEL

(71) Applicant: UTICA ENTERPRISES, INC., Troy, MI (US)

(72) Inventors: Mark A. Savoy, Warren, MI (US); Phillip J. I. Morgan, Royal Oak, MI (US)

(73) Assignee: UTICA ENTERPRISES, INC., Troy, MI (US)

( * ) Notice: Subject to any disclaimer, the term of this patent is extended or adjusted under 35 U.S.C. 154(b) by 0 days.

(21) Appl. No.: 15/412,287

(22) Filed: Jan. 23, 2017

(65) Prior Publication Data

US 2017/0216907 A1  Aug. 3, 2017

Related U.S. Application Data

(60) Provisional application No. 62/405,288, filed on Oct. 7, 2016, provisional application No. 62/400,809, filed on Sep. 28, 2016, provisional application No. 62/290,608, filed on Feb. 3, 2016.

(51) Int. Cl.
*B23P 11/00* (2006.01)
*B21J 15/08* (2006.01)
*B21J 15/02* (2006.01)
*B21D 39/03* (2006.01)

(52) U.S. Cl.
CPC ............ *B21J 15/08* (2013.01); *B21D 39/031* (2013.01); *B21J 15/025* (2013.01)

(58) Field of Classification Search
CPC ........ B21J 15/08; B21J 15/025; B21D 39/031
See application file for complete search history.

(56) References Cited

U.S. PATENT DOCUMENTS

| | | | |
|---|---|---|---|
| 5,380,978 A | 1/1995 | Pryor | |
| 5,533,146 A * | 7/1996 | Iwai | B23K 9/0956 219/121.63 |
| 8,234,770 B2 | 8/2012 | Durandet et al. | |
| 8,723,078 B2 * | 5/2014 | Mazumder | B23K 9/02 219/121.83 |
| 2002/0125297 A1 * | 9/2002 | Stol | B21J 15/027 228/112.1 |
| 2004/0134968 A1 * | 7/2004 | Opper | B23Q 17/24 228/103 |
| 2013/0087538 A1 | 4/2013 | Walter et al. | |
| 2013/0193121 A1 | 8/2013 | Alber | |
| 2016/0138636 A1 | 5/2016 | Noe et al. | |

OTHER PUBLICATIONS

PCT International Search Report and Written Opinion dated Apr. 2017, Application No. PCT/US2017/014501, Applicant Utica Enterprises, Inc., 7 Pages.

* cited by examiner

*Primary Examiner* — Ryan J Walters
(74) *Attorney, Agent, or Firm* — Brooks Kushman P.C.

(57) ABSTRACT

Apparatus (20, 22) and a method for mechanically joining a steel sheet portion (28 or 32) of advanced high strength steel to a metallic sheet portion (30 or 34) is performed to a light-safe extent by a detector assembly (106) during the mechanical joining that may be clinching, clinch riveting, full-punch riveting or self-piercing riveting.

14 Claims, 6 Drawing Sheets

APPARATUS AND METHOD FOR MECHANICALLY JOINING ADVANCED HIGH STRENGTH STEEL

CROSS-REFERENCE TO RELATED APPLICATIONS

This application claims the benefit of: U.S. Provisional application Ser. No. 62/405,288, filed on Oct. 7, 2016 by Mark A. Savoy and Phillip J. I. Morgan under the title APPARATUS AND METHOD FOR MECHANICALLY JOINING ADVANCED HIGH STRENGTH STEEL; U.S. Provisional application Ser. No. 62/400,809, filed on Sep. 28, 2016 by Mark A. Savoy and Phillip J. I. Morgan under the title APPARATUS AND METHOD FOR MECHANICALLY JOINING ADVANCED HIGH STRENGTH STEEL; and U.S. Provisional application Ser. No. 62/290,608 filed on Feb. 3, 2016 by Mark A. Savoy and Phillip J. I. Morgan under the title APPARATUS AND METHOD FOR CLINCHING ADVANCE HIGH STRENGTH STEEL; the entire disclosures of each of said provisional applications are hereby incorporated by reference.

TECHNICAL FIELD

This invention relates to an apparatus and method for mechanically joining advanced high strength steel using laser heating.

BACKGROUND

As disclosed by U.S. Pat. No. 8,234,770 Durandet et al., lasers have previously been used for joining metals using self-piercing rivets with preheating. Durandet et al. also discloses that the mechanical fastening method may be suitable for a clinching-type process or a press-joining process.

When lasers are utilized, metal joining processing must be carried out in a light-safe manner so that no scattered radiation from an intense laser beam causes damage to an operator. Previously such processing has been performed in a processing station that is secured against operator access during use so there is no exposure of operators to the laser beams.

SUMMARY

An object of the present invention is to provide improved apparatus for mechanically joining a first steel sheet portion of advanced high strength steel to a second metallic sheet portion using laser heating.

In carryout out the above object, apparatus according to the invention includes a joining assembly for positioning adjacent a first sheet portion of advanced high strength steel that is contacted with a second sheet portion of metal at an interface of the sheet portions. The joining assembly includes a housing defining a light-safe chamber having an opening and also includes an indexing member mounted on the housing with light-safe contact for movement parallel to the interface of the sheet portions between a heating position and a joining position. The indexing member includes an opening positioned in its heating position adjacent the opening of the housing and at a joining location of the first and second sheet portions, and the indexing member also includes a die located at the joining location of the sheet portions in its joining position. An actuator moves the indexing member of the joining assembly parallel to the interface of the first and second sheet portions between its heating and joining positions. A laser assembly of the joining assembly includes a laser collimator for projecting a laser beam from within the housing chamber through the opening of the housing and the opening of the indexing member in its heating position to provide heating of the first sheet portion of advanced high strength steel at the joining location and after the heating the actuator moves the indexing member parallel to the interface of the first and second sheet portions to the joining position. A detector assembly of the apparatus only permits operation of the laser assembly when the first sheet portion is in light-safe contact with the indexing member, and a clinch punch or rivet ram of the assembly cooperates with the die in the joining position of the indexing member to mechanically join the heated first sheet portion and the second sheet portion to each other at the joining location. A controller of the apparatus is configured to operate the joining assembly, the actuator, the laser assembly, and the clinch punch or the rivet ram for the joining operation of the sheet portions as well as any other necessary components of the apparatus.

As disclosed, the joining assembly may include a pivotal connection that mounts the indexing member on the housing for pivoting movement between the heating and joining positions or may include a slideway that mounts the indexing member on the housing for rectilinear movement between the heating and joining positions.

As also disclosed, the die is: a clinch die for providing a clinch joint; a clinch-rivet die for providing a clinch-rivet joint; a full-punch rivet die for providing a full-punch rivet joint; or a self-piercing rivet die for providing a self-piercing rivet joint.

The detector assembly as disclosed includes a source of pressurized gas for providing pressurized gas to the chamber of the housing and also including a detector for detecting gas flow from the source to the chamber to detect whether the first sheet portion is in light-safe contact with the indexing member.

The joining assembly as disclosed includes a temperature sensor for sensing the temperature of the first sheet portion at the joining location through the opening of the indexing member to control the laser heating by operation of the controller.

In one disclosed embodiment, the apparatus includes a parallel kinematic machine (PKM) operated by the controller and including: a first support; a tripod having three extendable and retractable struts mounted on and extending away from the first support in a converging manner toward each other; a second support mounted by the three struts spaced from the first support to mount the clinch punch or the rivet ram that cooperates with the die under operation of the controller to provide the joining that connects the sheet portions to each other; and rails that mount the PKM for movement in horizontal directions that are perpendicular to each other.

Another disclosed embodiment of the apparatus includes a C frame having one end that supports the joining assembly and having another end that supports the clinch punch or the rivet ram that cooperates with the die under operation of the controller to provide the joining of the first and second sheet portions to each other; and a robot of the apparatus moves the C frame under operation of the controller to provide the joining at different positions of the first and second sheet portions.

Another object of the invention provides an improved method for mechanically joining advanced high strength steel.

In carrying out the immediately preceding object, the method of the invention is performed by positioning a joining assembly adjacent a first sheet portion of advanced high strength steel that is contacted with a second sheet portion of metal at an interface of the sheet portions, with the joining assembly including a housing having an opening and defining a light-safe chamber and the joining assembly also including an indexing member mounted on the housing with light-safe contact for movement parallel to the interface of the sheet portions between a heating position and a joining position, and with the indexing member including an opening positioned in the heating position adjacent the opening of the housing at a joining location of the first and second sheet portions and with the indexing member in the joining position including a die located at the joining location of the sheet portions in the joining position. A laser beam is projected from within the housing chamber through the opening of the housing and the opening of the indexing member in its heating position to provide heating of the first sheet portion of advanced high strength steel at the joining location, and after the heating the indexing member is moved parallel to the interface of the first and second sheet portions to the joining position. Light-safe contact of the first sheet with the indexing member is detected to only then permit the operation of the laser beam. A clinch punch or a rivet ram is operated to cooperate with the die in the joining position of the indexing member to mechanically join the heated first sheet portion and the second sheet portion to each other at the joining location. A controller used is configured to control positioning of the joining assembly, projection of the light-safe laser beam, detection of the light-safe contact of the first sheet portion with the indexing member, operation of the clinch punch or the rivet ram, and any other processing of the joining of the first and second sheets to each other.

As disclosed, the indexing member is either pivotally moved or moved in rectilinear manner between the heating and joining positions.

As also disclosed, the joining provides a clinch joint; a clinch-rivet joint; a full-punch rivet joint; or a self-piercing rivet joint.

Flow of pressurized gas from the light-safe chamber is sensed as disclosed to control operation of the laser beam.

As further disclosed, the temperature of the first sheet portion is sensed at the joining location to control its heating.

In one practice of the method, a parallel kinematic machine (PKM) operated by the controller mounts and moves the clinch punch or the rivet ram that cooperates with the die to provide the joining that connects the sheet portions to each other, and the PKM is moved on rails that are perpendicular to each other.

In another practice of the method, opposite ends of a C frame mount the joining assembly and the clinch punch or the rivet ram that provide the joining operation, and the C frame is supported and moved by a robot.

The objects, features and advantages of the present invention are readily apparent from the following detailed description of the preferred embodiments when taken in connection with the referenced drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
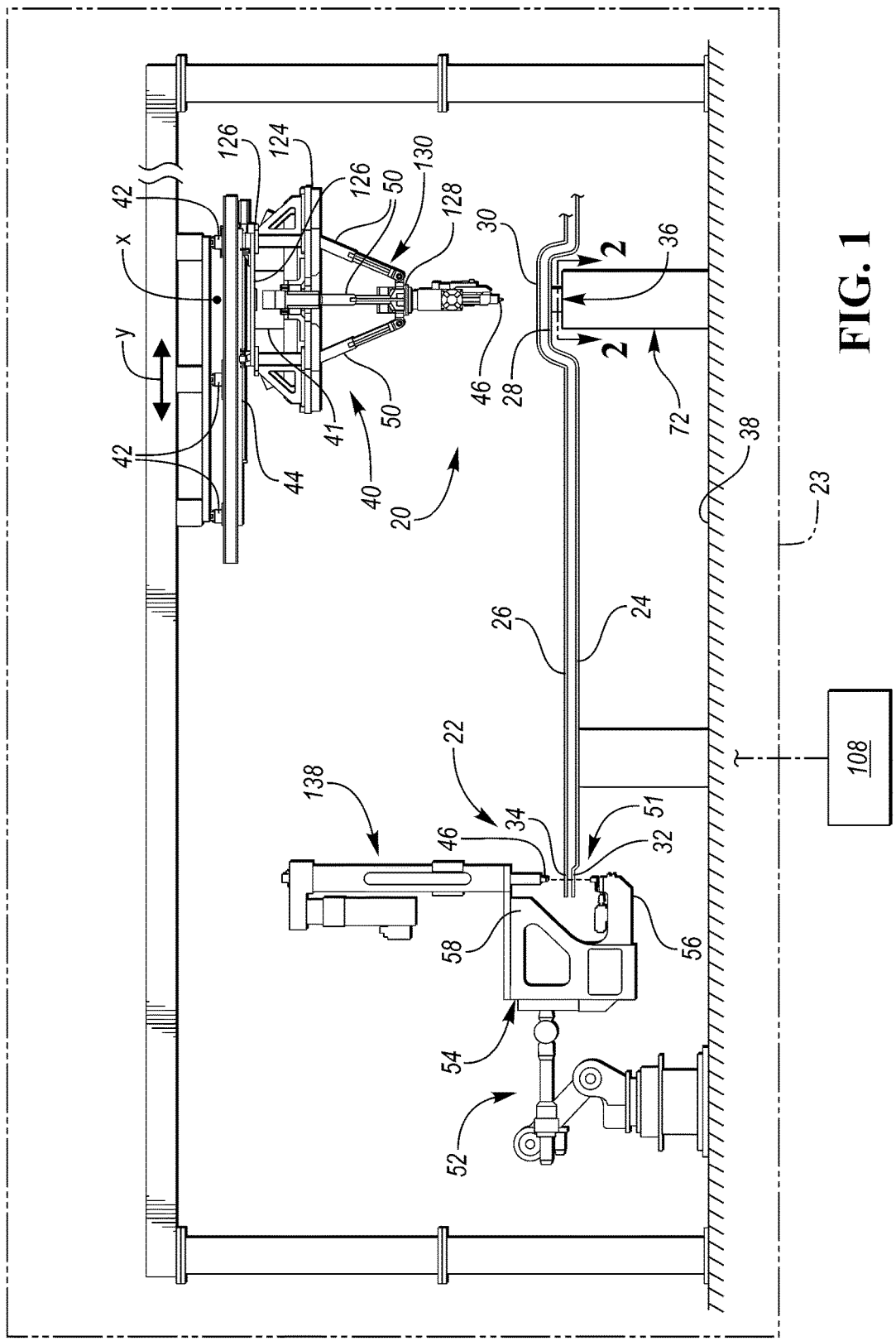
FIG. 1 is a somewhat schematic elevational view of two different embodiments of apparatus constructed according to the invention for performing a mechanical joining method of the invention in different ways.

With reference to FIG. 1, two embodiments of apparatus 20 and 22 constructed according to the invention are illustrated for providing a method of the invention for laser heating for mechanical joining advanced high strength steel. Both the apparatus and method of the invention will be described below in an integrated manner to facilitate an understanding of different aspects of the invention. Also, the advanced high strength steel joined has a tensile strength of 700 mega pascals up to 1500 mega pascals or more. As such, advanced high strength steels have particular utility for use in vehicle body manufacturing such as with underbody components by providing high strength with a relatively thin gauge and thus lightweight construction that enhances vehicle fuel efficiency while still having structural strength. However, such advanced high strength steels are hard and not sufficiently ductile so as to be capable to be formed for mechanical joining.

The two embodiments of laser heating apparatus 20 and 22 shown in FIG. 1 are within a light-safe work station 23 that can be controlled so no operation of the laser heating can be performed unless human access thereto is prevent. However, the work station can also be configured so human access thereto during the laser heating can be permitted as is hereinafter described. The laser heating is performed to provide mechanical joining of a steel piece 24 of advanced high strength steel and a metallic piece 26 that have an interface 27 (FIG. 4) and are respectively lower and upper underbody components as shown, but may also be other vehicle body components as well as other metallic structures. More specifically, the advanced high strength steel piece 24 and metallic piece 26 respectively have a first sheet portion 28 and a second sheet portion 30 that are joined by the apparatus 20 and also have a first sheet portion 32 and a second sheet portion 34 that are joined by the apparatus 22. The sheet portions 28 and 32 of advanced high strength steel are directly heated by laser heating so as to be more ductile to permit the mechanical joining. The metallic piece 26 may also be made of advanced high strength steel or another metal, such as less hard steel, aluminum, etc., and its sheet portions 30 and 34 may or may not be also heated by the laser heating and/or conduction heating from the sheet portions 28 and 32 of steel piece 24 so as to be more ductile for the mechanical joining.

With continuing reference to FIG. 1, the laser joining apparatus 20 includes a joining assembly 36 mounted on a horizontal support 38 such as the factory floor. Laser heating provided by the apparatus 20 heats the steel sheet portion 28 of advanced high strength steel to facilitate the joining operation as is hereinafter more fully described. Apparatus 20 also includes a parallel kinematic machine (referred to as a PKM) 40 that is mounted by a schematically illustrated riser 41 on horizontal rails 42 and 44 that extend in perpendicular directions to each other. The PKM 40 supports a clinch punch or rivet ram 46 that cooperates with a die 48 (FIGS. 2 and 3) of the joining assembly 36 to provide the joining. More specifically, the PKM 40 is movable in horizontal directions perpendicular to each other along the rails 42 and 44 to different work locations while the operation of struts 50 of the PRM by extension and retraction as is hereinafter more fully described moves the clinch punch or rivet ram 46 to different locations and orientations within each work zone.

With continuing reference to FIG. 1, the laser joining apparatus 22 includes a joining assembly indicated by 51 and is supported by a robot 52 for movement to provide joining at different locations. As shown, the apparatus 22 includes a C frame 54 having one end 56 supporting the joining assembly 51 from which a laser beam is provided to provide heating of the sheet portion 32 of the steel piece 24 made of advanced high strength steel, and the C frame 54 has another end 58 that supports a punch or rivet ram 46. Joining assembly 51 on the end 58 of the C frame 54 includes the die 48 (FIGS. 13A, B, C and 14-16) that cooperates with the clinch punch or rivet ram 46 to provide the mechanical joining.

Figure 13A:
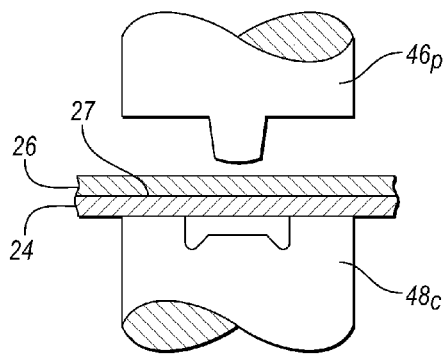
FIG. 13A is a partial view of the apparatus in preparation for clinching of a first sheet portion of advanced high strength steel and a second sheet portion of metal at a joining location of the sheet portions in preparation for their mechanical joining.
Figure 13B:
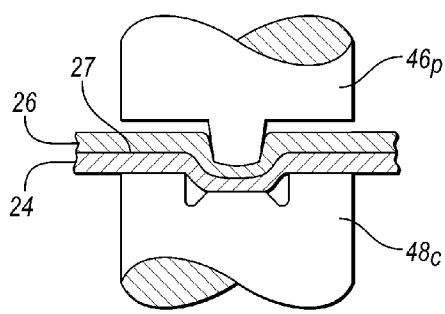
FIG. 13B is an intermediate stage of the joining after initial downward movement of the punch to perform the clinching of the sheet portions to each other.
Figure 13C:
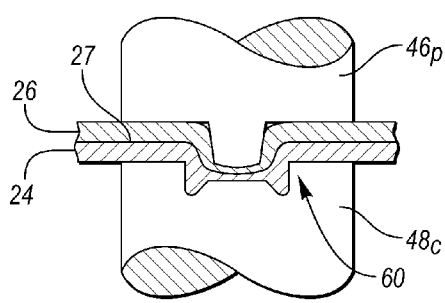
FIG. 13C shows the completion of the clinching of the sheet portions to each other by the downward punch movement prior to upward movement of the punch for another cycle.

As illustrated in the progression of FIGS. 13A, 13B and 13C, the clinch punch $46_p$ and a clinch die $48_c$ of each embodiment of the apparatus 20 and 22 cooperate with each other to provide a clinch joint 60 as shown in FIG. 13C for joining the first and second sheet portions of the steel pieces 24 and 26 to each other.

Figure 14:
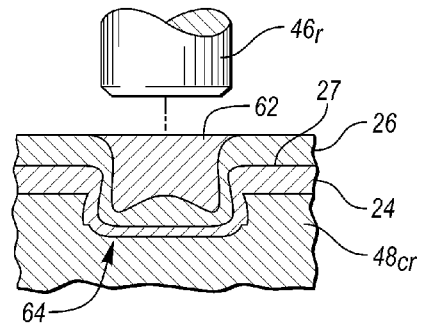
FIG. 14 is a view similar to FIG. 13C showing the sheet portions after clinching by a clinch-rivet die and a clinch rivet moved by a rivet ram.

With reference to FIG. 14, a clinch-rivet die $48_{cr}$, and a rivet 62 under the operation of rivet ram $46_r$ provide a clinch-rivet joint 64 of the metallic pieces 24 and 26 to each other.

Figure 15:
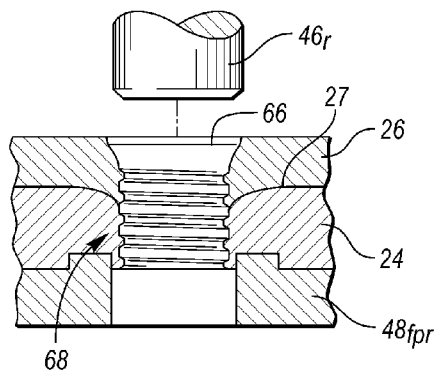
FIG. 15 is a view similar to FIG. 14 showing the sheet portions after mechanical joining of the sheet portions by a full punch rivet die and a full punch rivet moved by a rivet ram.

With reference to FIG. 15, a full-punch rivet die $48_{fpr}$ and a full-piercing rivet 66 provide a full-punch rivet operation that provides a full-punch rivet joint 68. In this embodiment, a punched out piece drops below the die $48_{fpr}$ by driving of the rivet 66 with the rivet ram $46_r$.

Figure 16:
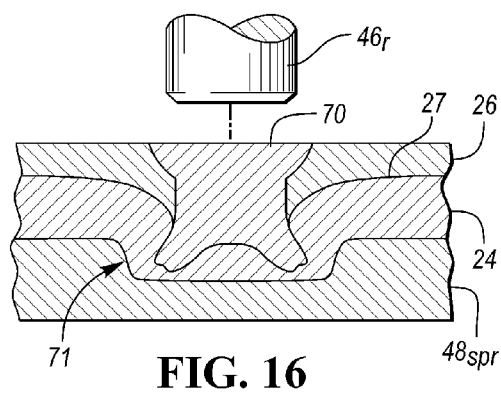
FIG. 16 is a view similar to FIGS. 14 and 15 showing the sheet portions after mechanical joining to each other by a self-piercing rivet moved by a rivet ram and backed up by a self-piercing rivet die.

With reference to FIG. 16, a self-piercing rivet die $48_{spr}$ and a self-piercing rivet 70 driven by rivet ram $46_r$ provide a self-piercing rivet joint 71 between the metallic sheet portions 24 and 26.

Light-safe limits of lasers can vary according to parameters of the United States Occupational Safety & Health Administration of the Department of Labor in its Technical Manual Section III: Chapter 6. Specifically, nonbeam hazards, biological effects and laser hazard classifications can vary for any specific operation as determined by specified investigation guidelines and control measures. Laser heating of advanced high strength steel for the mechanical joining as described above requires a Class IV laser beam that must be light-safe from human exposure. Both the apparatus 20 and 22 are light-safe in performing the heating as described below.

Figure 4:
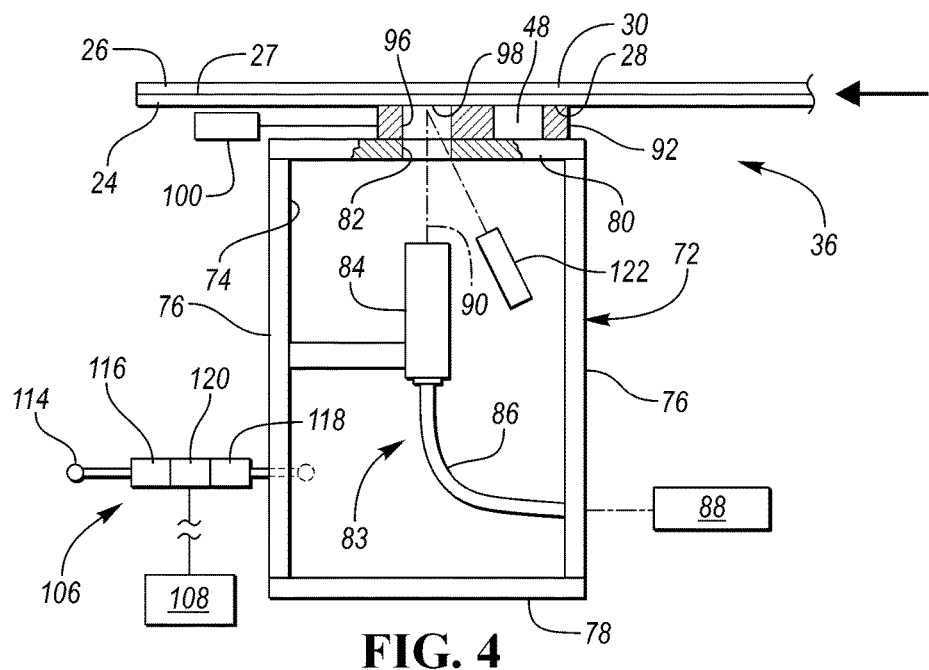
FIG. 4 is an elevational view taken partially in section along the direction of line 4-4 in FIG. 2 and showing the manner in which the laser heating is performed in preparation for the joining.

With reference to FIG. 4, the joining assembly 36 of apparatus 20 includes a housing 72 that has a light-safe chamber 74 defined by vertical walls 76, a floor 78 and a ceiling 80. A work location of the ceiling 80 has an opening 82 at the upper extremity of the chamber 74. A laser assembly 83 of the joining assembly 36 includes a laser collimator 84 that is located within the chamber 74 and receives a laser through a cable 86 from a laser generator 88, concentrates the laser as a beam 90, and projects the laser beam upwardly through the housing opening 82.

Figures 2, 3:
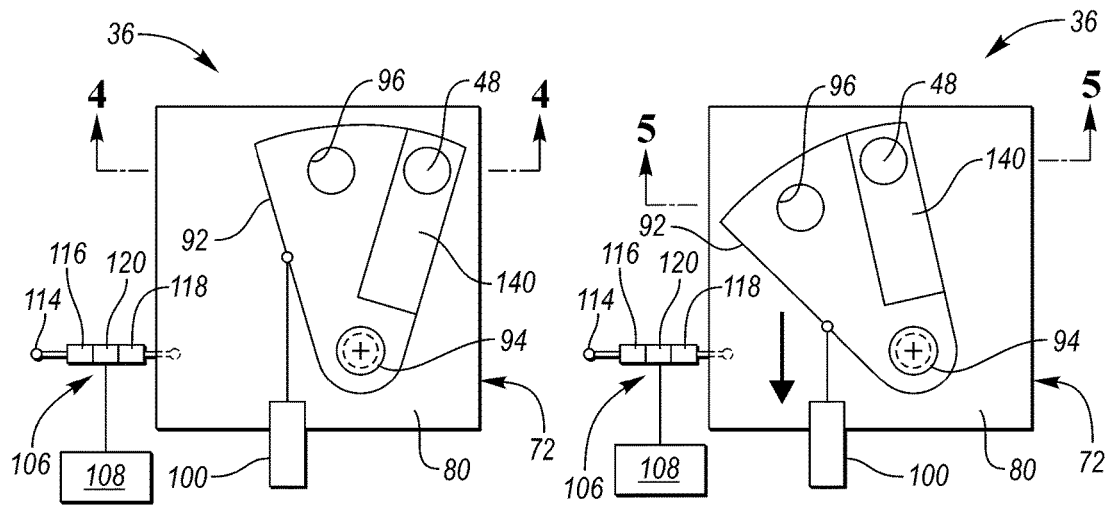
FIG. 2 is a top plan view of a joining assembly of one embodiment of the apparatus taken along the direction of line 2-2 in FIG. 1 and showing an indexing member of the joining assembly in a heating position.
FIG. 3 is a top plan view similar to FIG. 2 but after laser heating and showing the indexing member pivotally moved to a joining position for the mechanical joining operation.
Figure 5:
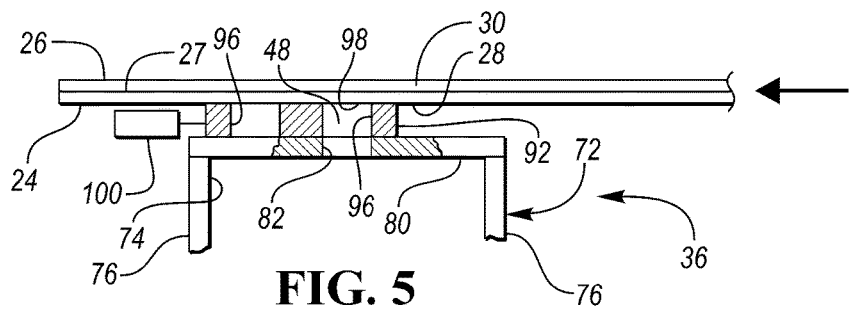
FIG. 5 is a partial sectional view taken along the direction of line 5-5 in FIG. 3 to show the positioning of the indexing member during the joining operation.

With continuing reference to FIG. 4, joining assembly 36 also includes an indexing member 92 mounted in this embodiment by a pivotal connection 94 (FIGS. 2 and 3) on the ceiling 80 of housing 72 for movement parallel to the interface 27 of the sheet portions of metallic pieces 24 and 26 between a heating position shown in FIG. 2 and a joining position shown in FIG. 3. The indexing member 92 has an opening 96 positioned adjacent the opening 82 of the housing 72 in its ceiling 80 at a joining location 98 of the first and second sheet portions of metallic pieces 24 and 26 when the indexing member is in the heating position for heating by the laser beam 90. Furthermore, the indexing member 92 supports the previously mentioned die 48 that is located as shown in FIG. 5 at the joining location 98 of the sheet portions in the joining position of the indexing member.

As shown in FIGS. 2-5, an actuator 100 moves the indexing member 92 of the joining assembly 36 parallel to the interface 27 of the first and second sheet portions between its heating and joining positions respectively shown in FIGS. 2, 4 and FIGS. 3, 5.

Thus, the laser assembly 83 shown in FIG. 4 projects the laser beam 90 upwardly through the housing opening 82 and the opening 96 of the indexing member 92 in its heating position to provide heating of the sheet portion of the metallic piece 24 of advanced high strength steel at the joining location 98 so it becomes more ductile to permit the mechanical joining operation of any one of the types previously described. After the heating, the actuator 100 moves the indexing member 92 parallel to the interface of the sheet portions of the metallic pieces 24 and 26 to the joining position of FIG. 5 for the joining operation. This heating and indexing to the joining position can be done quickly so there is minimal temperature loss that reduces the temperature to which the heating must be done to provide the steel with sufficient ductility for the mechanical joining.

As shown in FIG. 4, a detector assembly 106 only permits operation of the laser assembly 83 when the sheet portion of the metallic piece 24 of advanced high strength steel is in light-safe contact with the indexing member 92. Thus, the laser beam 90 is always contained so to prevent any exposure outward of the joining assembly 36 so that operation and/or maintenance can be performed by a human operator during the laser heating.

The PKM 40 shown in FIG. 1 supports the clinch punch or rivet ram 46 as previously described in connection with FIGS. 13A, 13B, 13C, 14, 15 and 16 for cooperating with the associated die 48 to mechanically join the heated first sheet portion and the second sheet portion to each other at the joining location of the indexing member where the heating provides the ductility needed to permit the metal movement for the joining.

A controller 108 shown in FIG. 1 operates, as shown in FIGS. 2-5, the joining assembly 36, actuator 100, laser assembly 83, the detector assembly 106, and the clinch punch or rivet ram 46 shown in FIG. 1 as well as operating any other necessary components of the apparatus for the joining.

As previously mentioned in connection with the embodiment of FIGS. 2-5, this embodiment of the joining assembly 36 includes the pivotal connection 94 that mounts the indexing member 92 on the housing 72 for movement between the heating position shown in FIGS. 2 and 4 and the joining position shown in FIGS. 3 and 5.

Figure 6:
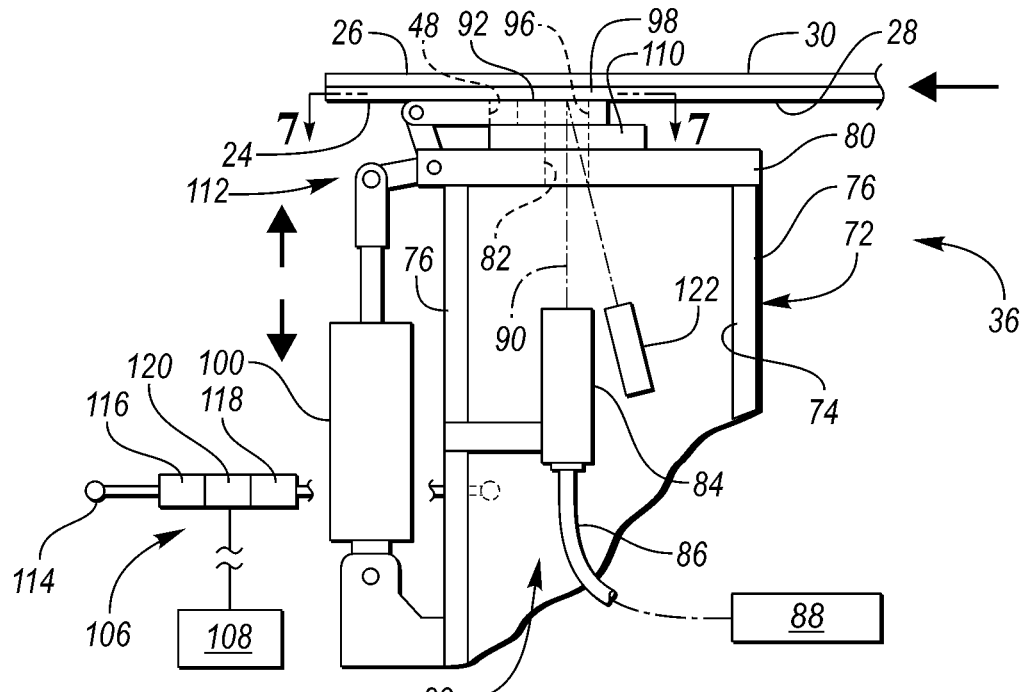
FIG. 6 is an elevational view of another embodiment of the joining assembly and is generally the same as FIG. 4 showing the manner in which laser heating takes place in preparation for the joining operation.
Figure 7:
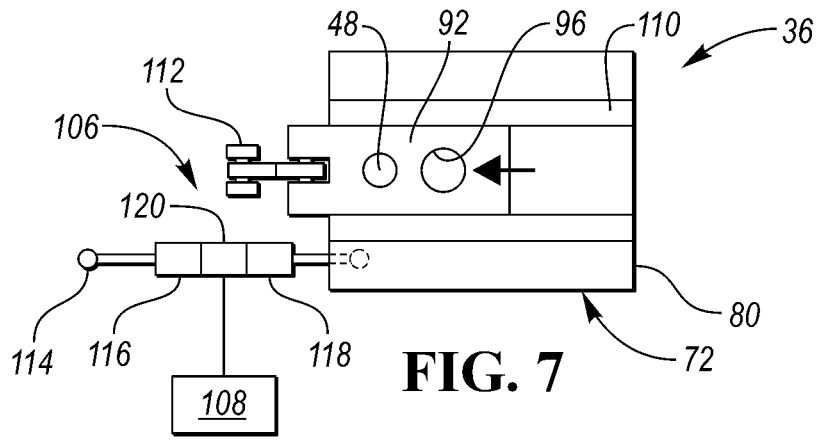
FIG. 7 is a top plan view taken along the direction of line 7-7 in FIG. 6 to illustrate the indexing member positioned during the laser heating.
Figure 8:
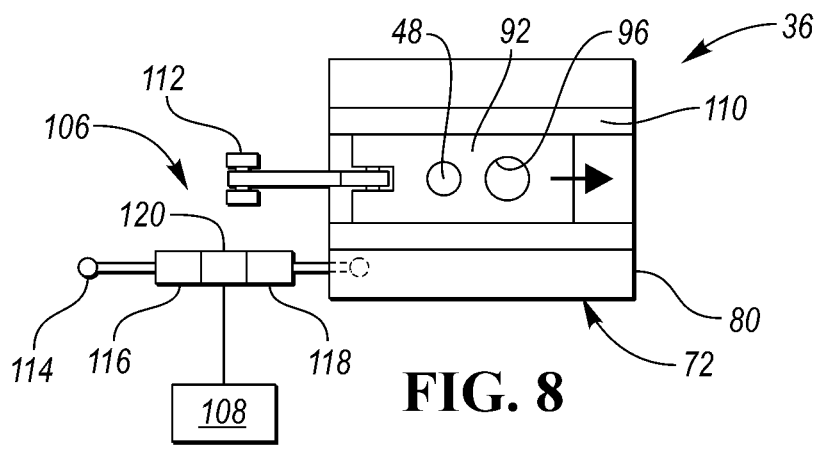
FIG. 8 is a top plan view like FIG. 7 but after the laser heating showing the indexing member moved rectilinearly to the joining position in preparation for the mechanical joining.

Another embodiment of the joining assembly 36 illustrated in FIGS. 6-8 includes a slideway 110 that mounts the indexing member 92 on the housing 72 for rectilinear movement between the heating position of FIG. 7 and the joining position of FIG. 8 under the control of the actuator 100. In each embodiment, the actuator 100 is a cylinder that extends and retracts to provide the indexing member movement with the embodiment of FIGS. 6-8 having a linkage 112 that provides the connection of the actuator to the indexing member.

As illustrated in FIGS. 4 and 6, each of the embodiments of the joining assembly 36 has its detection assembly including a source of pressurized gas 114 for providing pressurized gas to the chamber 74 of the joining assembly housing 72 as well as including sensors 116 and 118 between which a detector 120 is located to detect sufficient gas movement between the sensors which is indicative of a lack of light-safe sealing of the indexing member opening 96 by the sheet portion of metallic piece 24 in order to provide a signal to the controller 108 that prevents the laser assembly 83 from projecting the laser beam 90 when it cannot be sufficiently contained.

As also shown in FIGS. 4 and 6, each embodiment of the joining assembly 36 includes a temperature sensor 122 for sensing the temperature of the sheet portion of the metallic piece 24 at the joining location 98 through the opening 96 of the indexing member to control the laser heating through operation of the controller 108 to which it is connected.

With reference to FIG. 1, the previously mentioned PKM 40 includes the riser 41 that connects a first support 124 thereof to a carriage 126 that is supported for movement in perpendicular directions by the perpendicular rails 42 and 44 to a selected position under operation of the controller 108. The previously mentioned extendable and retractable struts 50 extend from the first support 124 to a second support 128 to provide a tripod 130 with the second support mounting the punch or rivet ram 46 for rotation and angular positioning that permits the operation at any required orientation in cooperation with the joining assembly 51 as previously described. The struts 50 may be extendable and retractable in any suitable manner such as disclosed by United States patent application Publication No. 2016/0263641, published on Sep. 15, 2016 by Mark A. Savoy and Phillip J. I. Morgan under the title WORK STATION AND METHOD FOR JOINING METALLIC SHEETS, the entire disclosure of which is hereby incorporated by reference. More specifically, the struts 50 may each be embodied by a roller screw having: an upper end pivotally connected to the first support 124 of the PKM and a lower end pivotally connected to the second support 128, an elongated screw, a nut including a plant carrier and a plurality of threaded rollers rotatable on the planet carrier and meshed with the screw such that relative rotation between the screw and the nut changes the length of the strut.

With reference to FIGS. 1 and 9-12 the other embodiment of the apparatus 22 is supported for movement by the robot 52 instead of a PKM but has many of the same components, except as will be mentioned, that operate the same way as the PKM embodiment and thus have like reference numerals applied thereto so that much of the prior description is also applicable and will not be repeated.

Figures 9, 10:
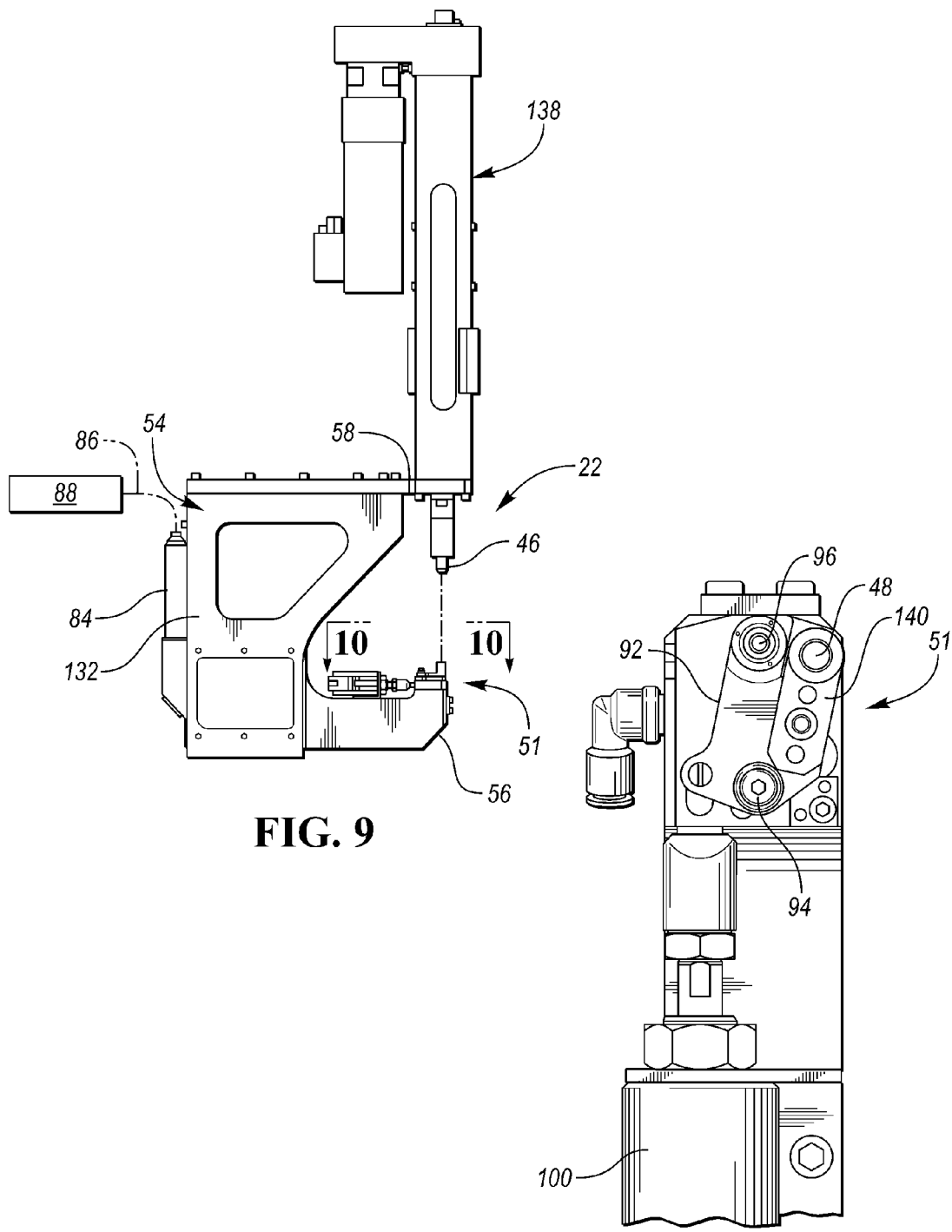
FIG. 9 is an elevational view of another embodiment of the apparatus constructed according to the invention to provide the mechanical joining method of advanced high strength steel in a light-safe manner.
FIG. 10 is a plan view taken along the direction of line 10-10 in FIG. 9 to show the joining assembly of the apparatus in its heating position.
Figure 11:
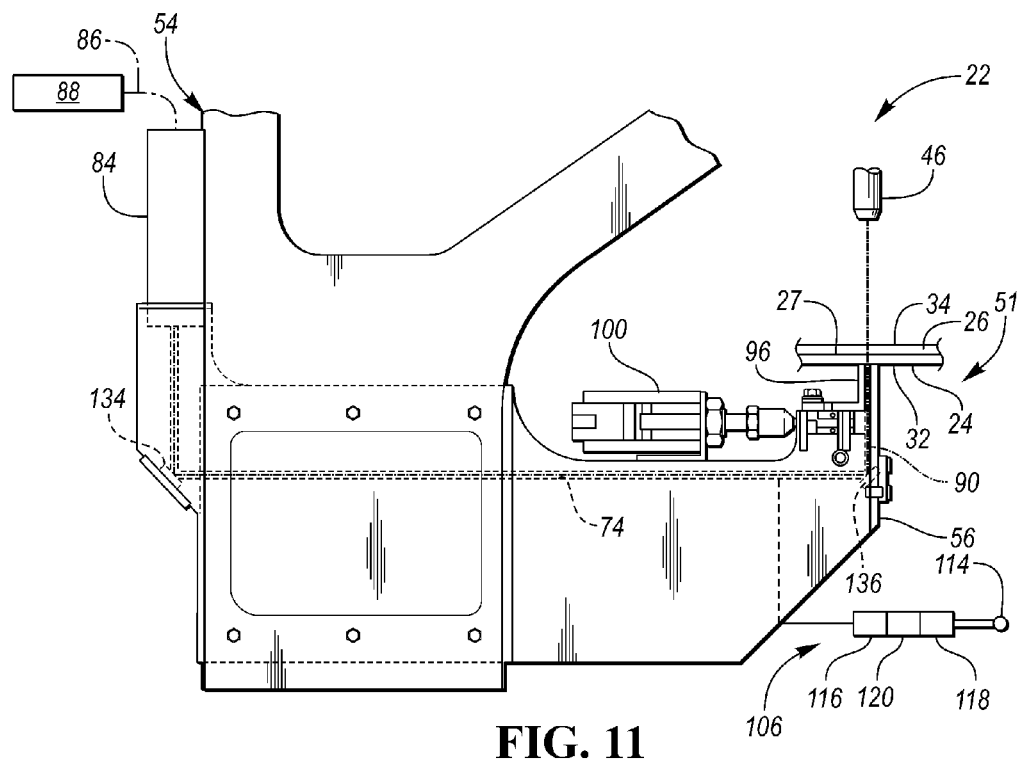
FIG. 11 is an enlarged view of a portion of FIG. 9 for further illustrating the construction of the joining assembly.
Figure 12:
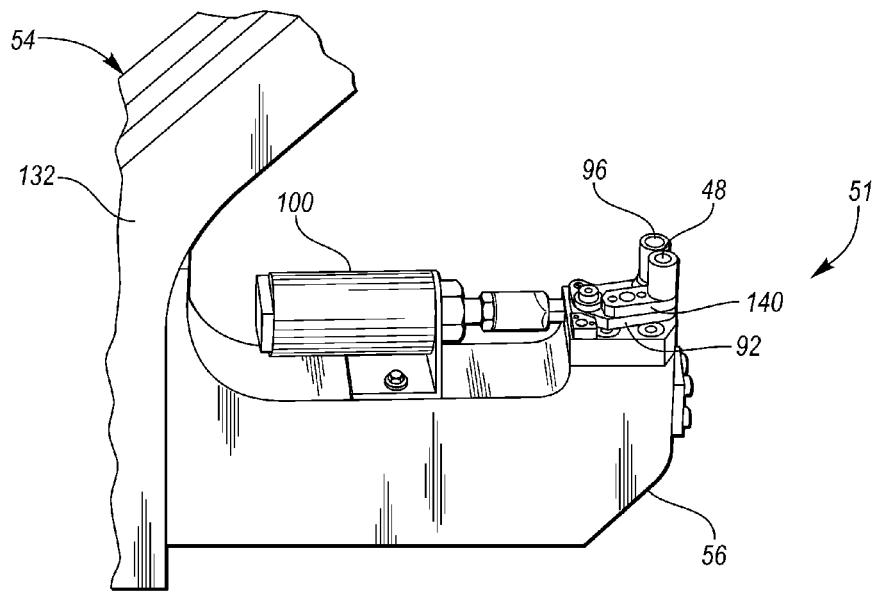
FIG. 12 is a perspective view of a portion of FIG. 9 to further illustrate the joining assembly of the apparatus.

In the embodiment of the apparatus 22 as illustrated in FIG. 9 the housing 132 providing the C frame 54 supports the laser collimator 84 and, as shown best in FIG. 11, has its laser beam 90 projecting toward a first mirror 134 within the light-safe chamber 74 defined by the housing. That first mirror 134 reflects the laser beam 90 degrees toward a second mirror 136 for reflection 90 degrees upwardly toward the indexing member 92 which functions generally the same as the previously described embodiment of FIGS. 2-5 by pivoting between its heating position and its joining positions. Extension and retraction of the piston connecting rod of actuator 100 in this embodiment pivots the indexing member 92 about pivotal connection 94 to move between the heating positon and the joining position.

With further reference to FIG. 9, the apparatus 22 includes a roller screw 138 that moves the clinch punch or rivet ram 46 vertically to provide the joining operation. Each of the embodiments of FIGS. 2-5 and 9-12 has its indexing member provided with a die insert 140 that is secured in any suitable manner such as by threaded fastening to the associated indexing member 92 to provide switching of the die 48 between different jobs or replacement as necessary.

During vehicle body assembly for which this invention has particular utility, the sheet metal piece of advanced high strength steel being joined will normally have thickness of 0.7 to 2 millimeters and will be heated to a temperature of 500 to 700° C. and normally not more than 730° C. to avoid adversely affecting the microstructure of the advanced high strength steel. The heating time will normally be about one second and the indexing time about 0.1 to 0.3 of a second, the time to perform the joining will be about 0.3 to 0.5 of a second and as previously mentioned the laser will be of a class IV or the like from which there is protection for human safety. Thus, even if operators are located within the enclosed work station 23 shown in FIG. 1, the operation will be laser-safe due to the containment of scattered radiation from the laser beam as described. Furthermore, the laser utilized may be a fiber laser with a wavelength of 1,064 microns or a diode laser with a wavelength of 980 microns. Also, during the laser heating and mechanical joining, any suitable but unshown clamping or the like may be used to position the sheet portions 28 and 30 as well as 32 and 34 with respect to each other and with respect to the associated apparatus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for mechanically joining advanced high strength steel comprising:
    a joining assembly for positioning adjacent a first sheet portion of advanced high strength steel that is contacted with a second sheet portion of metal at an interface of the sheet portions, the joining assembly including a housing defining a light-safe chamber having an opening and also including an indexing member mounted on the housing with light-safe contact for movement parallel to the interface of the sheet portions between a heating position and a joining position, the indexing member including an opening positioned in the heating position adjacent the opening of the housing at a joining location of the first and second sheet portions, and the indexing member also including a die located in the joining position at the joining location of the sheet portions;
    an actuator that moves the indexing member of the joining assembly parallel to the interface of the first and second sheet portions between its heating and joining positions;
    a laser assembly including a laser collimator for projecting a laser beam from within the housing chamber through the opening of the housing and the opening of the indexing member in its heating position to provide heating of the first sheet portion of advanced high strength steel at the joining location and after the heating the actuator moving the indexing member parallel to the interface of the first and second sheet portions to the joining position;
    a detector assembly for only permitting operation of the laser assembly when the first sheet portion is in light-safe contact with the indexing member;
    a clinch punch or rivet ram for cooperating with the die in the joining position of the indexing member to mechanically join the heated first sheet portion and the second sheet portion to each other at the joining location; and
    a controller configured to operate the joining assembly, the actuator, the laser assembly, the detector assembly, and the clinch punch or the rivet ram for the joining operation of the sheet portions.

2. Apparatus for mechanically joining advanced high strength steel as in claim 1 further including either a pivotal connection that mounts the indexing member on the housing for pivoting movement between the heating and joining positions or a slideway that mounts the indexing member on the housing for rectilinear movement between the heating and joining positions.

3. Apparatus for mechanically joining advanced high strength steel as in claim 1 wherein the die is: a clinch die for providing a clinch joint; a clinch-rivet die for providing a clinch-rivet joint; a full-punch rivet die for providing a full-punch rivet joint; or a self-piercing rivet die for providing a self-piercing rivet joint.

4. Apparatus for mechanically joining advanced high strength steel as in claim 1 wherein the detector assembly includes a source of pressurized gas for providing pressurized gas to the chamber of the housing and also including a detector for detecting gas flow from the source to the chamber to detect whether the first sheet portion is in light-safe contact with the indexing member.

5. Apparatus for mechanically joining advanced high strength steel as in claim 1 further including a temperature sensor for sensing the temperature of the first sheet portion at the joining location through the opening of the indexing member to control the laser heating by operation of the controller.

6. Apparatus for mechanically joining advanced high strength steel as in claim 1 further including a parallel kinematic machine (PKM) operated by the controller and including: a first support; a tripod having three extendable and retractable struts mounted on and extending away from the first support in a converging manner toward each other; a second support mounted by the three struts spaced from the first support to mount the clinch punch or the rivet ram that cooperates with the die under operation of the controller to provide the joining that connects the sheet portions to each other; and rails that mount the PKM for movement in horizontal directions that are perpendicular to each other.

7. Apparatus for mechanically joining advanced high strength steel as in claim 1 which includes a C frame having one end that supports the joining assembly and having another end that supports the clinch punch or the rivet ram that cooperates with the die under operation of the controller to provide the joining of the first and second sheet portions to each other; and a robot that moves the C frame under operation of the controller to provide the joining at different positions of the first and second sheet portions.

8. A method for mechanically joining advanced high strength steel comprising:
    positioning a joining assembly adjacent a first sheet portion of advanced high strength steel that is contacted with a second sheet portion of metal at an interface of the sheet portions, with the joining assembly including a housing having an opening and defining a light-safe chamber and the joining assembly also including an indexing member mounted on the housing with light-safe contact for movement parallel to the interface of the sheet portions between a heating position and a joining position, and with the indexing member including an opening positioned in the heating position adjacent the opening of the housing at a joining location of the first and second sheet portions and with the indexing member including a die located in the joining position at the joining location of the sheet portions;

projecting a laser beam from within the housing chamber through the opening of the housing and the opening of the indexing member in its heating position to provide heating of the first sheet portion of advanced high strength steel at the joining location and after the heating moving the indexing member parallel to the interface of the first and second sheet portions to the joining position;

detecting light-safe contact of the first sheet with the indexing member to only then permit the operation of the laser beam;

operating a clinch punch or a rivet ram to cooperate with the die in the joining position of the indexing member to mechanically join the heated first sheet portion and the second sheet portion to each other at the joining location; and using a controller configured to control positioning of the joining assembly, projection of the light-safe laser beam, detection of the light-safe contact of the first sheet portion with the indexing member, and operation of the clinch punch or the rivet ram.

9. A method for mechanically joining advanced high strength steel as in claim 8 wherein the indexing member is either pivotally moved or moved in rectilinear manner between the heating and joining positions.

10. A method for mechanically joining advanced high strength steel as in claim 8 wherein the joining provides a clinch joint; a clinch-rivet joint; a full-punch rivet joint; or a self-piercing rivet joint.

11. A method for mechanically joining advance high strength steel as in claim 8 wherein pressurized gas flow from the light-safe chamber is sensed to control operation of the laser beam.

12. A method for mechanically joining advanced high strength steel as in claim 8 wherein the temperature of the first sheet portion is sensed at the joining location to control its heating.

13. A method for mechanically joining advanced high strength steel as in claim 8 wherein a parallel kinematic machine (PKM) operated by the controller mounts and moves the clinch punch or the rivet ram that cooperates with the die to provide the joining that connects the sheet portions to each other, and wherein the PKM is moved on rails that are perpendicular to each other.

14. A method for mechanically joining advanced high strength steel as in claim 8 wherein opposite ends of a C frame mount the joining assembly and the clinch punch or the rivet ram that provide the joining operation, and wherein the C frame is supported and moved by a robot.

* * * * *

UNITED STATES PATENT AND TRADEMARK OFFICE
CERTIFICATE OF CORRECTION

PATENT NO. : 9,815,109 B2  
APPLICATION NO. : 15/412287  
DATED : November 14, 2017  
INVENTOR(S) : Mark A. Savoy et al.

Page 1 of 1

It is certified that error appears in the above-identified patent and that said Letters Patent is hereby corrected as shown below:

In the Claims

Column 12, Line 9, Claim 11:  
After "for mechanically joining"  
Delete "advance" and  
Insert -- advanced --.

Signed and Sealed this  
Nineteenth Day of June, 2018

Andrei Iancu  
*Director of the United States Patent and Trademark Office*